US012572766B2

(12) United States Patent
Lee et al.

(10) Patent No.: US 12,572,766 B2
(45) Date of Patent: Mar. 10, 2026

(54) BARCODE READER ASSEMBLY

(71) Applicant: ZEBRA TECHNOLOGIES CORPORATION, Lincolnshire, IL (US)

(72) Inventors: Roland Wing Fai Lee, Jericho, NY (US); Raghuraj Srinivasan, Holtsville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 35 days.

(21) Appl. No.: 18/592,407

(22) Filed: Feb. 29, 2024

(65) Prior Publication Data

US 2025/0278587 A1 Sep. 4, 2025

(51) Int. Cl.
*G06K 7/10* (2006.01)
(52) U.S. Cl.
CPC ................................. *G06K 7/10881* (2013.01)
(58) Field of Classification Search
CPC .................................................. G06K 7/10881
USPC ...................................................... 235/472.01
See application file for complete search history.

(56) References Cited

U.S. PATENT DOCUMENTS

| | | | | |
|---|---|---|---|---|
| 5,314,243 A | * | 5/1994 | McDonald | G07F 11/62 |
| | | | | 312/249.11 |
| 9,844,868 B1 | * | 12/2017 | Abbey | B25D 17/24 |

| | | | | |
|---|---|---|---|---|
| 9,977,873 B1 | * | 5/2018 | Shoenfeld | A61J 7/0084 |
| 2003/0121982 A1 | * | 7/2003 | Charpentier | G07G 1/0045 |
| | | | | 235/472.01 |
| 2004/0046027 A1 | * | 3/2004 | Leone | G08B 13/2462 |
| | | | | 235/462.13 |
| 2005/0288571 A1 | * | 12/2005 | Perkins | A61B 5/0002 |
| | | | | 600/407 |
| 2006/0125356 A1 | * | 6/2006 | Meek | A61G 12/001 |
| | | | | 312/215 |
| 2016/0027095 A1 | * | 1/2016 | Boer | B65G 1/1375 |
| | | | | 414/800 |
| 2018/0369437 A1 | * | 12/2018 | Grossman | A61L 2/24 |
| 2019/0381673 A1 | * | 12/2019 | Lee | B25J 11/008 |
| 2020/0065536 A1 | * | 2/2020 | Utykanski | H02J 7/0047 |
| 2021/0024112 A1 | * | 1/2021 | Ting | B62B 3/10 |
| 2021/0064830 A1 | * | 3/2021 | Handshaw | G06K 7/1443 |
| 2021/0267707 A1 | * | 9/2021 | Sung | G06F 3/016 |
| 2021/0394930 A1 | * | 12/2021 | O'Toole | A47G 29/30 |
| 2024/0111975 A1 | * | 4/2024 | Barkan | G06K 7/10722 |
| 2024/0407543 A1 | * | 12/2024 | Mensing | A47B 21/04 |
| 2025/0084957 A1 | * | 3/2025 | Martinez | F16M 11/10 |

* cited by examiner

*Primary Examiner* — Allyson N Trail
(74) *Attorney, Agent, or Firm* — Yuri Astvatsaturov

(57) ABSTRACT

An example mobile workstation that is movable by an operator includes a display device, a mounting bracket, and a barcode reader assembly. The barcode reader assembly includes a handheld barcode reader and a cradle configured to be secured to the mounting bracket. The cradle has a mechanical latch mechanism configured to removably retain the handheld barcode reader in the cradle. A first force is required to move the handheld barcode reader past the mechanical latch mechanism and insert the handheld barcode reader fully into the cradle and a second force, greater than the first force, is required to move the handheld barcode reader past the mechanical latch mechanism and remove the handheld barcode reader from the cradle.

24 Claims, 11 Drawing Sheets

BARCODE READER ASSEMBLY

BACKGROUND

Some handheld barcode reader assemblies can be used on mobile workstations. These barcode reader assemblies require that the handheld barcode reader be able to be inserted into the cradle with minimal force, but have a higher retention/removal force to retain the handheld barcode reader in the cradle as the mobile workstation is being moved and still allow the user to remove the handheld barcode reader from the cradle.

SUMMARY

In an embodiment, the present invention is a mobile workstation that is movable by an operator. The mobile workstation comprises a display device, a mounting bracket, and a barcode reader assembly mounted to the mounting bracket. The barcode reader assembly includes a handheld barcode reader and a cradle configured to be secured to the mounting bracket. The cradle comprises a mechanical latch mechanism that is configured to: removably retain the handheld barcode reader in the cradle; require a first force to move the handheld barcode reader past the mechanical latch mechanism and insert the handheld barcode reader fully into the cradle; and require a second force, greater than the first force, to move the handheld barcode reader past the mechanical latch mechanism and remove the handheld barcode reader from the cradle.

In a variation of this embodiment, the mounting bracket is secured to the display device and at least a portion of the mounting bracket extends above the display device.

In another variation of this embodiment, the first force is equal to or less than a weight of the handheld barcode reader.

In another variation of this embodiment, the second force is greater than or equal to two times a weight of the handheld barcode reader and less than or equal to four times the weight of the handheld barcode reader.

In another variation of this embodiment, the latch mechanism comprises a latch bolt that is configured to rotate about a first axis with a first force placed on a first face of the latch bolt and to translate along a second axis, perpendicular to the first axis, with a second force placed on a second face of the latch bolt.

In another variation of this embodiment, the mechanical latch mechanism comprises a compression spring coupled to the latch bolt. The compression spring is configured to bend with the first force placed on the first face of the latch bolt and the latch bolt rotated about the first axis and to compress with the second force placed on the second face of the latch bolt and the latch bolt translated along the second axis.

In another variation of this embodiment, the latch bolt comprises a key section having a generally cylindrical protrusion extending along the first axis and a linear protrusion extending from the cylindrical protrusion along the second axis. A housing of the cradle comprises an aperture having an arcuate portion configured to receive the cylindrical protrusion of the key section of the latch bolt and a linear portion configured to receive the linear protrusion of the latch bolt.

In another variation of this embodiment, the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

In another variation of this embodiment, the cradle comprises a magnet configured to attract a portion of the handheld barcode reader with the handheld barcode reader inserted into the cradle.

In another variation of this embodiment, the mounting bracket comprises an aperture, the cradle comprises a threaded aperture, and the aperture in the mounting bracket and the threaded aperture in the cradle are configured to receive a threaded member to secure the cradle to the mounting bracket.

In another embodiment, the present invention is a barcode reader assembly configured to be mounted on a mobile workstation that is movable by an operator. The barcode reader assembly comprises a handheld barcode reader and a cradle comprising a mechanical latch mechanism that is configured to removably retain the handheld barcode reader in the cradle. A first force is required to move the handheld barcode reader past the mechanical latch mechanism and insert the handheld barcode reader fully into the cradle and a second force, greater than the first force, is required to move the handheld barcode reader past the mechanical latch mechanism and remove the handheld barcode reader from the cradle.

In a variation of this embodiment, the first force is equal to or less than a weight of the handheld barcode reader.

In another variation of this embodiment, the second force is greater than or equal to two times a weight of the handheld barcode reader and less than or equal to four times the weight of the handheld barcode reader.

In another variation of this embodiment, the latch mechanism comprises a latch bolt that is configured to rotate about a first axis with a first force placed on a first face of the latch bolt and to translate along a second axis, perpendicular to the first axis, with a second force placed on a second face of the latch bolt.

In another variation of this embodiment, the latch mechanism comprises a compression spring coupled to the latch bolt. The compression spring is configured to bend with the first force placed on the first face of the latch bolt and the latch bolt rotated about the first axis and to compress with the second force placed on the second face of the latch bolt and the latch bolt translated along the second axis.

In another variation of this embodiment, the latch bolt comprises a key section having a generally cylindrical protrusion extending along the first axis and a linear protrusion extending from the cylindrical protrusion along the second axis. A housing of the cradle comprises an aperture having an arcuate portion configured to receive the cylindrical protrusion of the key section of the latch bolt and a linear portion configured to receive the linear protrusion of the latch bolt.

In another variation of this embodiment, the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

In another variation of this embodiment, the cradle comprises a magnet configured to attract a portion of the handheld barcode reader with the handheld barcode reader inserted into the cradle.

In another embodiment, the present invention is a cradle for a barcode reader assembly configured to be mounted on a mobile workstation that is movable by an operator. The cradle comprises a housing forming a cavity configured to receive a handheld barcode reader and a mechanical latch mechanism disposed within the housing and configured to removably retain the handheld barcode reader in the cradle. A first force is required to move the handheld barcode reader past the mechanical latch mechanism and insert the handheld barcode reader fully into the cradle and a second force, greater than the first force, is required to move the handheld barcode reader past the mechanical latch mechanism and remove the handheld barcode reader from the cradle.

In a variation of this embodiment, the first force is equal to or less than a weight of the handheld barcode reader.

In another variation of this embodiment, the second force is greater than or equal to two times a weight of the handheld barcode reader and less than or equal to four times the weight of the handheld barcode reader.

In another variation of this embodiment, the latch mechanism comprises a latch bolt that is configured to rotate about a first axis with a first force placed on a first face of the latch bolt and to translate along a second axis, perpendicular to the first axis, with a second force placed on a second face of the latch bolt.

In another variation of this embodiment, the latch mechanism comprises a compression spring coupled to the latch bolt. The compression spring is configured to bend with the first force placed on the first face of the latch bolt and the latch bolt rotated about the first axis and to compress with the second force placed on the second face of the latch bolt and the latch bolt translated along the second axis.

In another variation of this embodiment, the latch bolt comprises a key section having a generally cylindrical protrusion extending along the first axis and a linear protrusion extending from the cylindrical protrusion along the second axis. A housing of the cradle comprises an aperture having an arcuate portion configured to receive the cylindrical protrusion of the key section of the latch bolt and a linear portion configured to receive the linear protrusion of the latch bolt.

In another variation of this embodiment, the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

In another variation of this embodiment, the cradle comprises a magnet configured to attract a portion of the handheld barcode reader with the handheld barcode reader inserted into the cradle.

In another variation of this embodiment, the housing comprises a threaded aperture configured to receive a threaded member to secure the cradle to a mounting bracket.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

4

Figure 1:
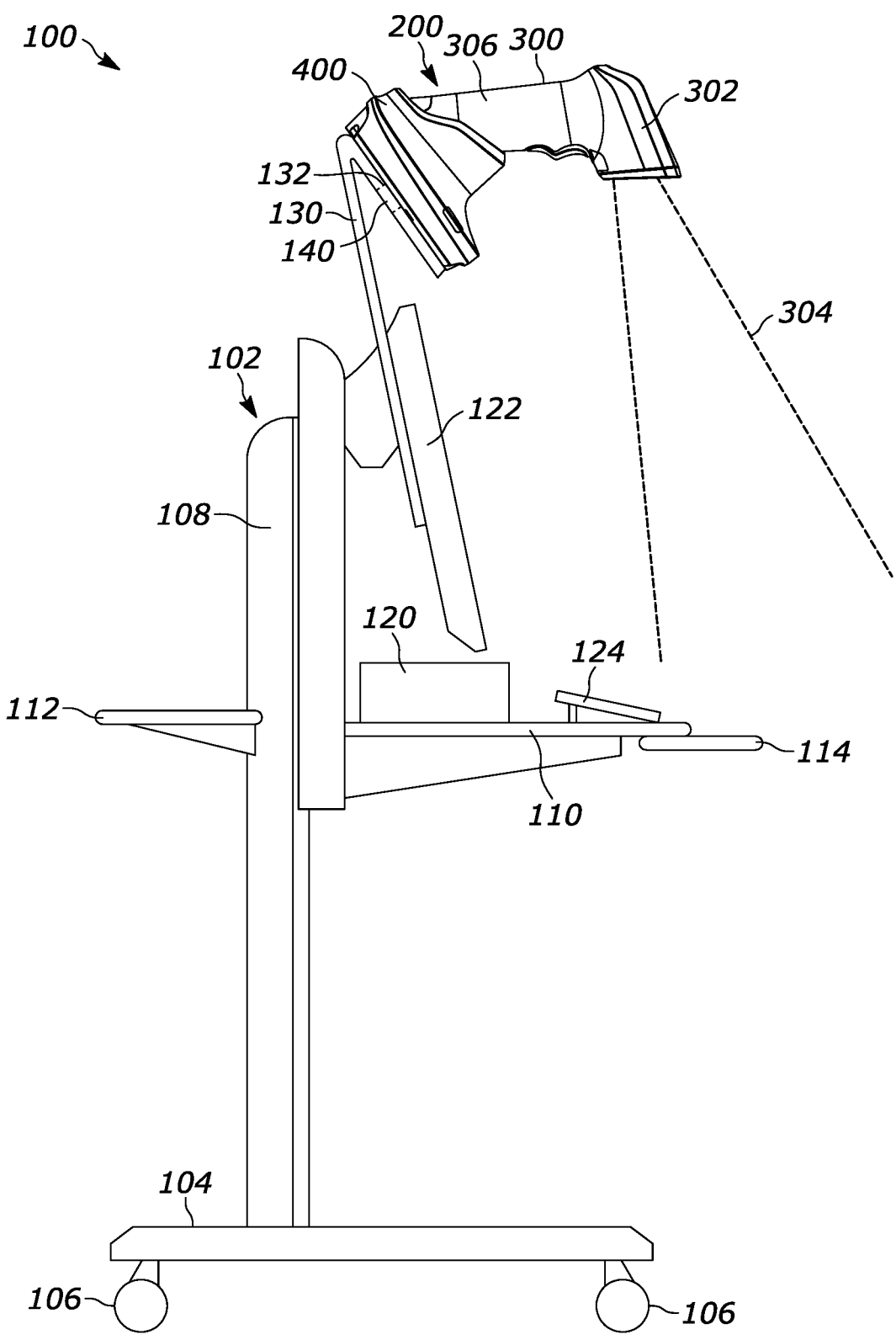
Figure 2:
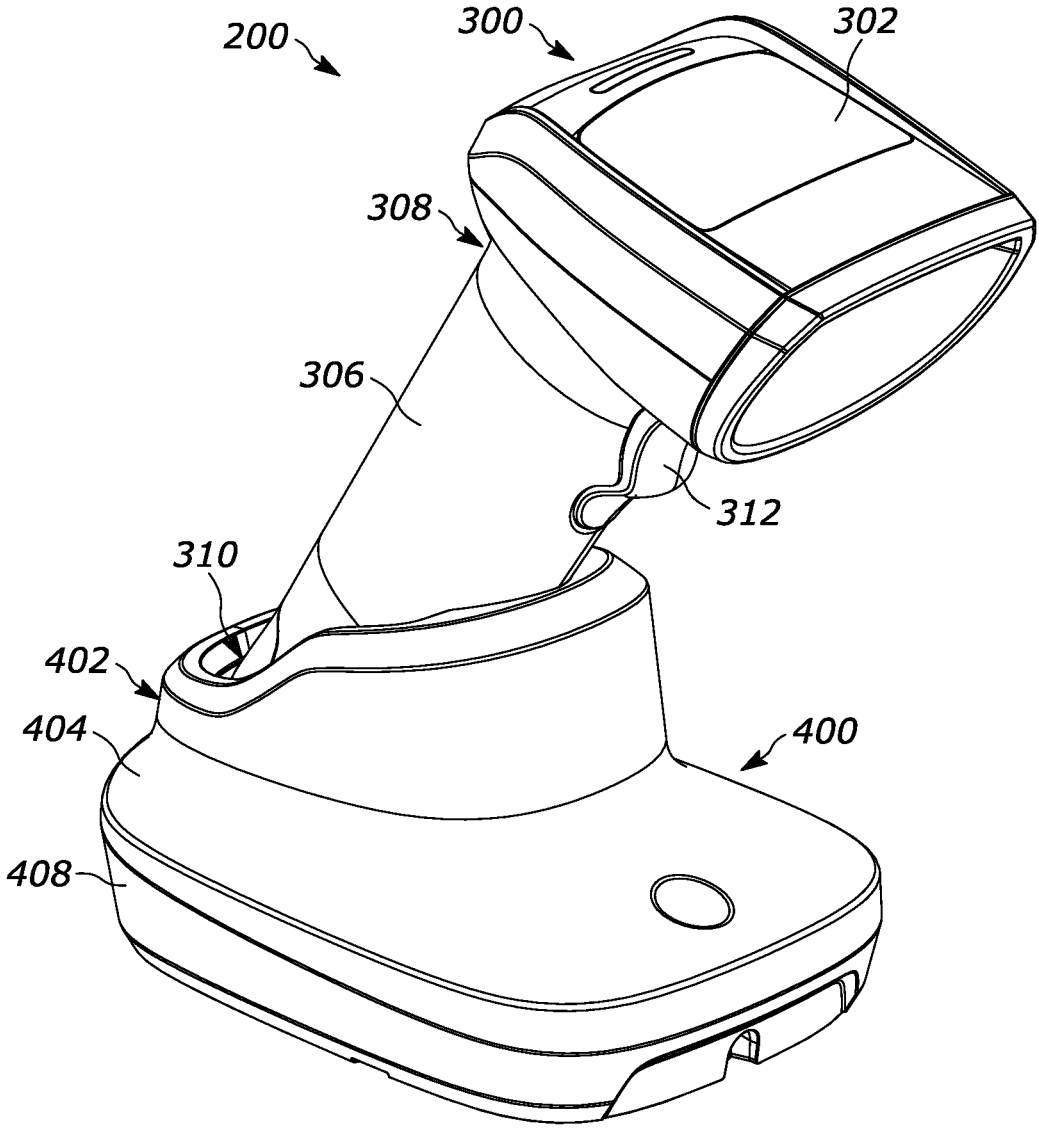
Figure 3:
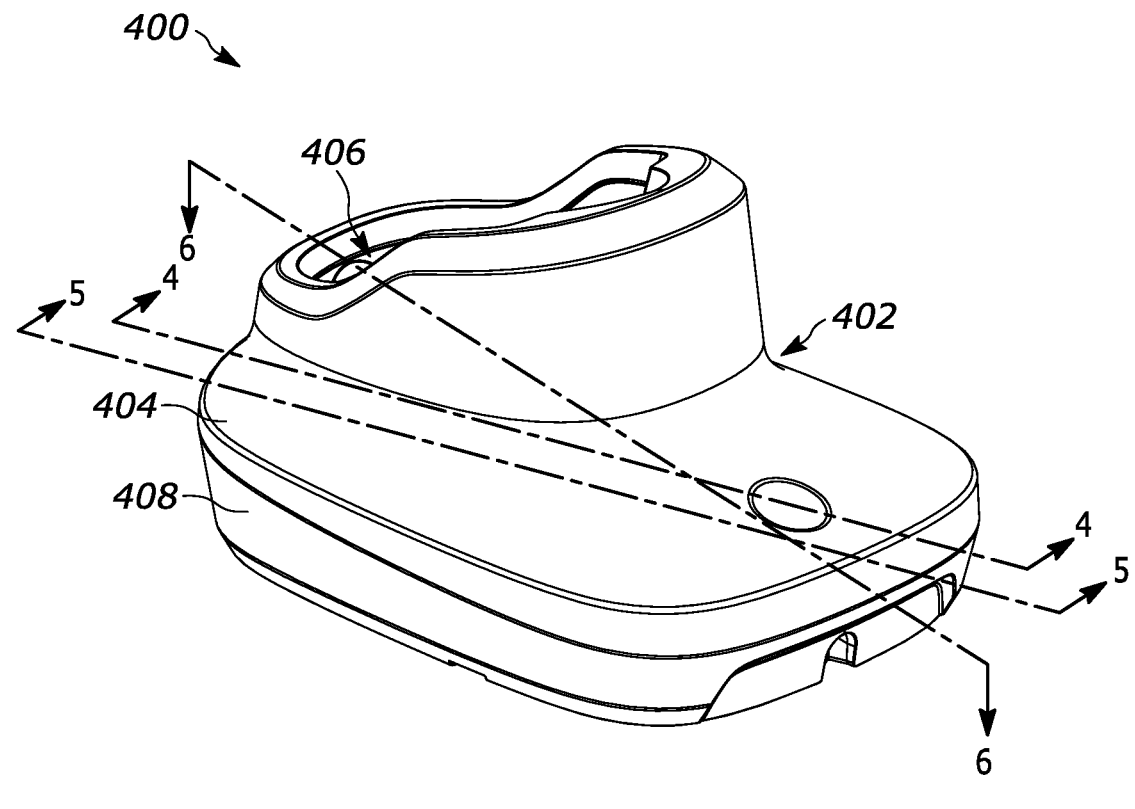
Figure 4:
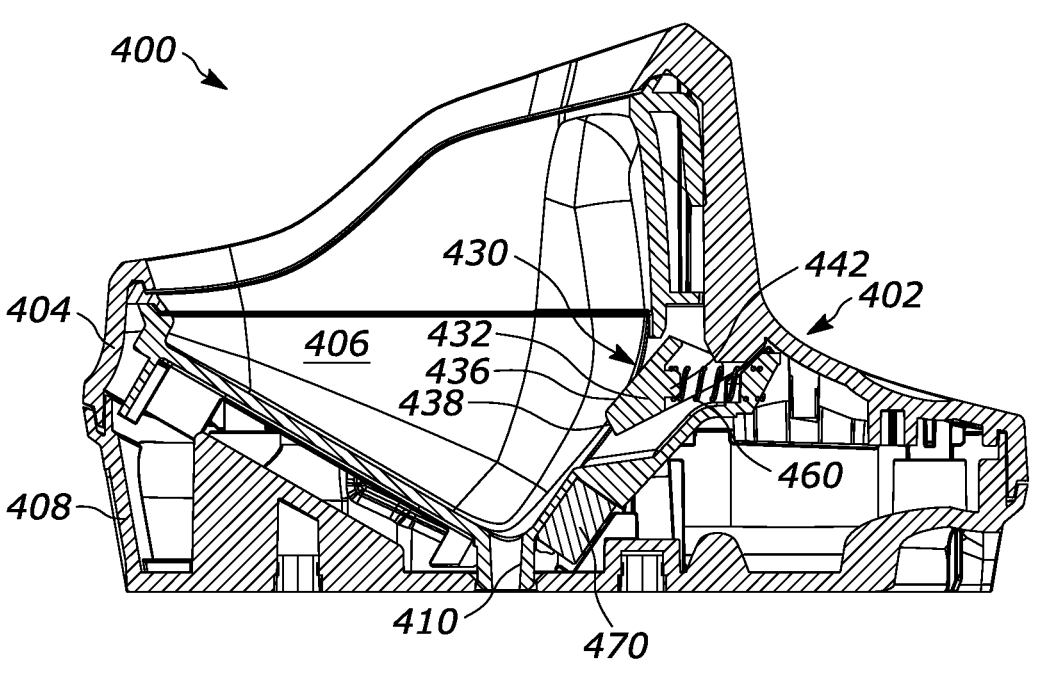
Figure 5:
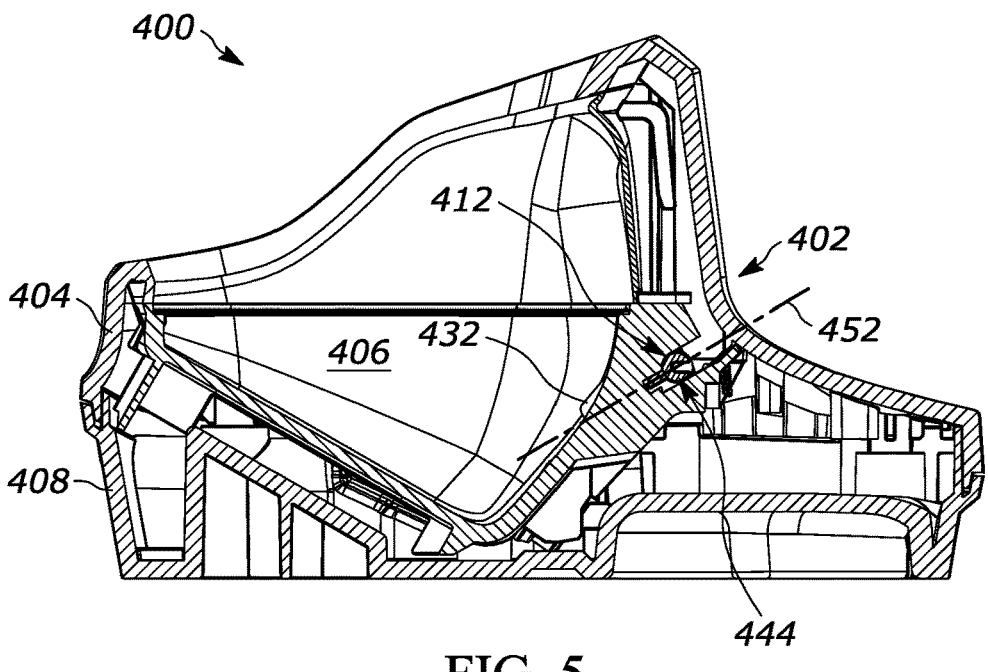
Figure 6:
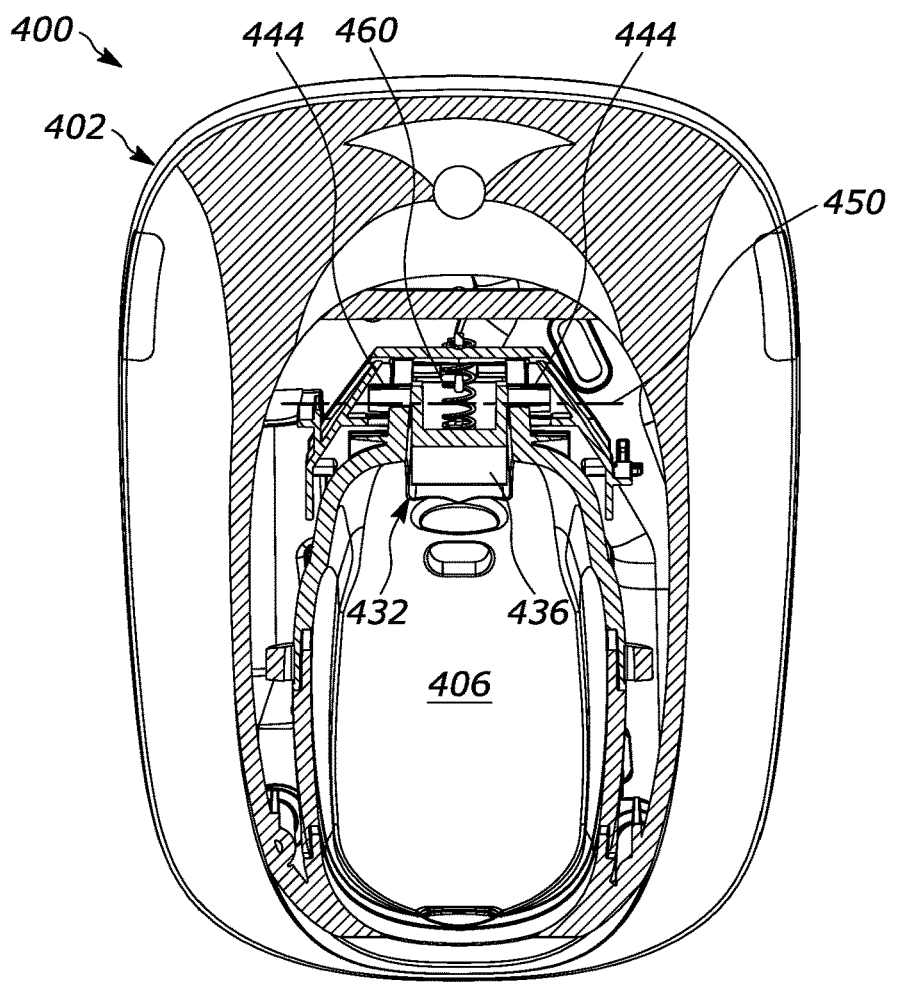
Figure 7:
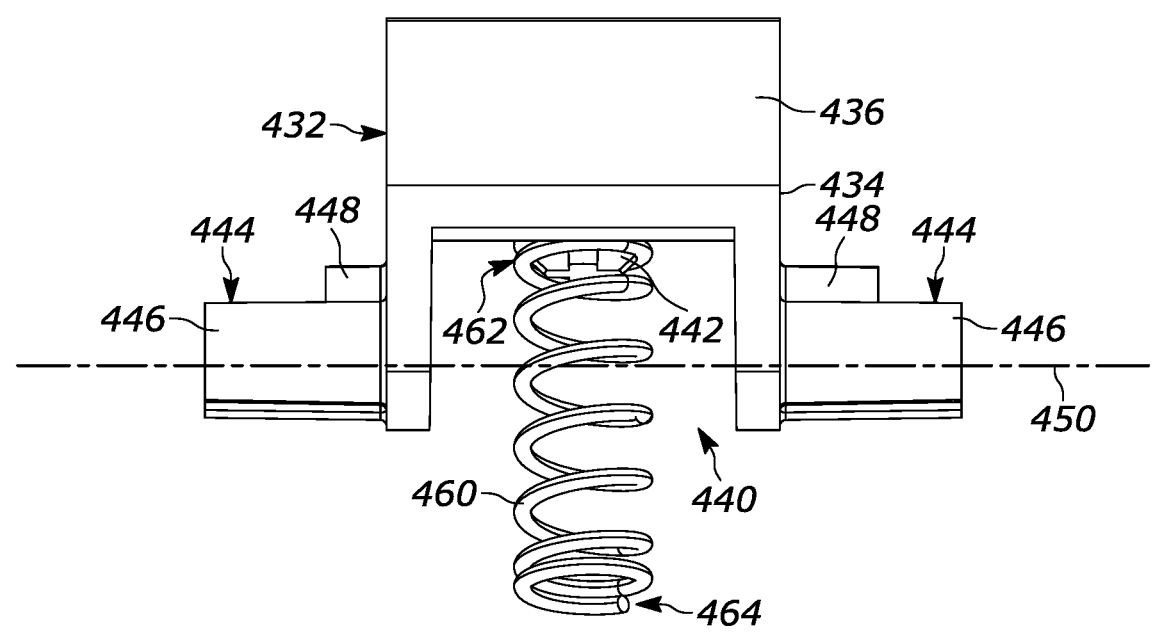
Figure 8:
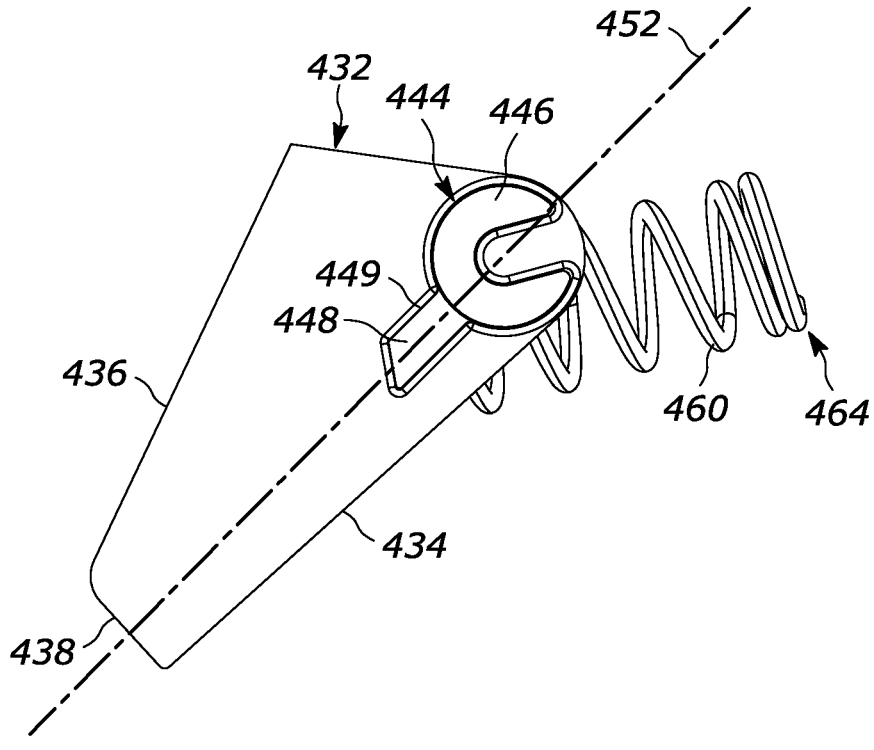
Figure 9:
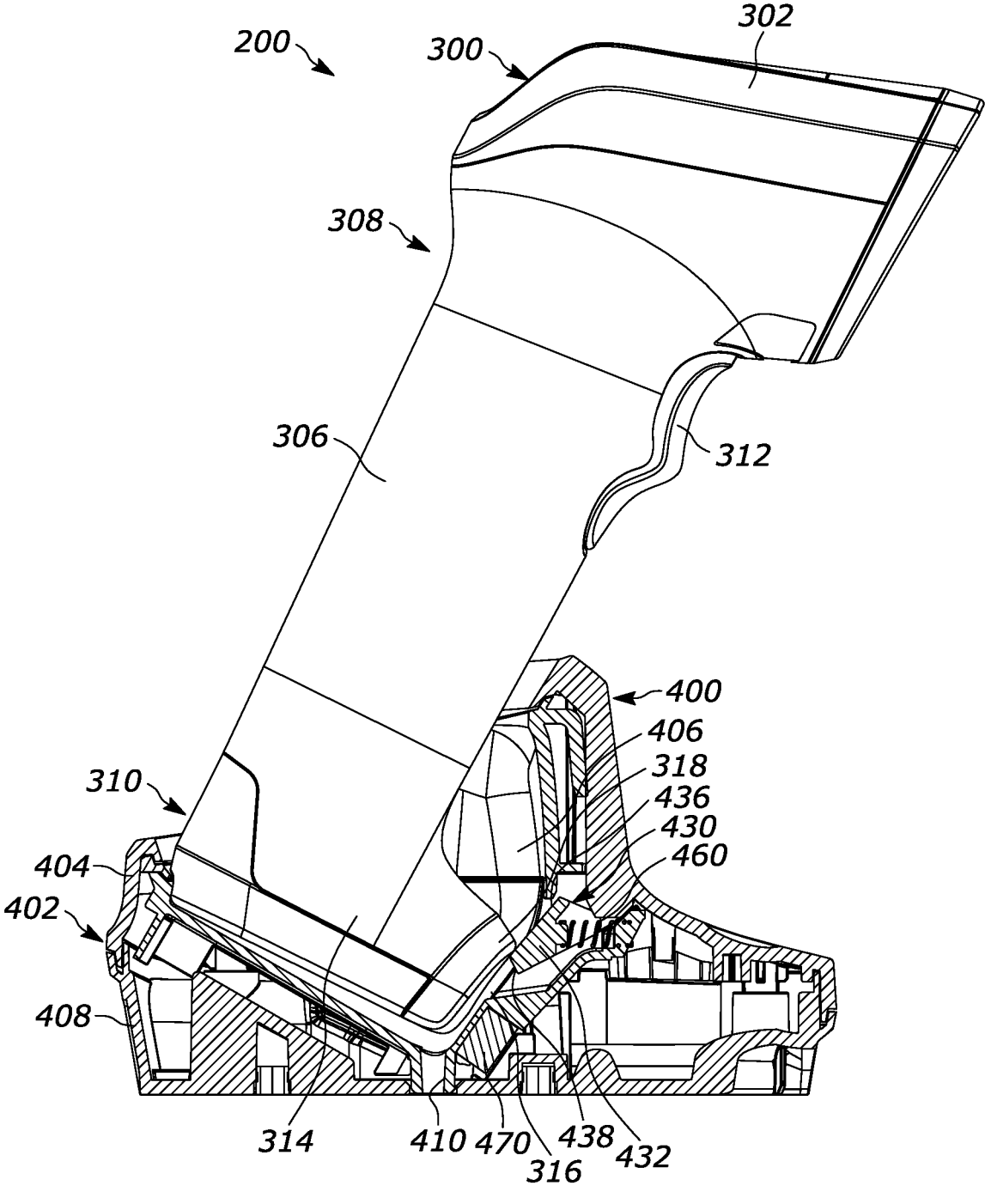
Figure 10:
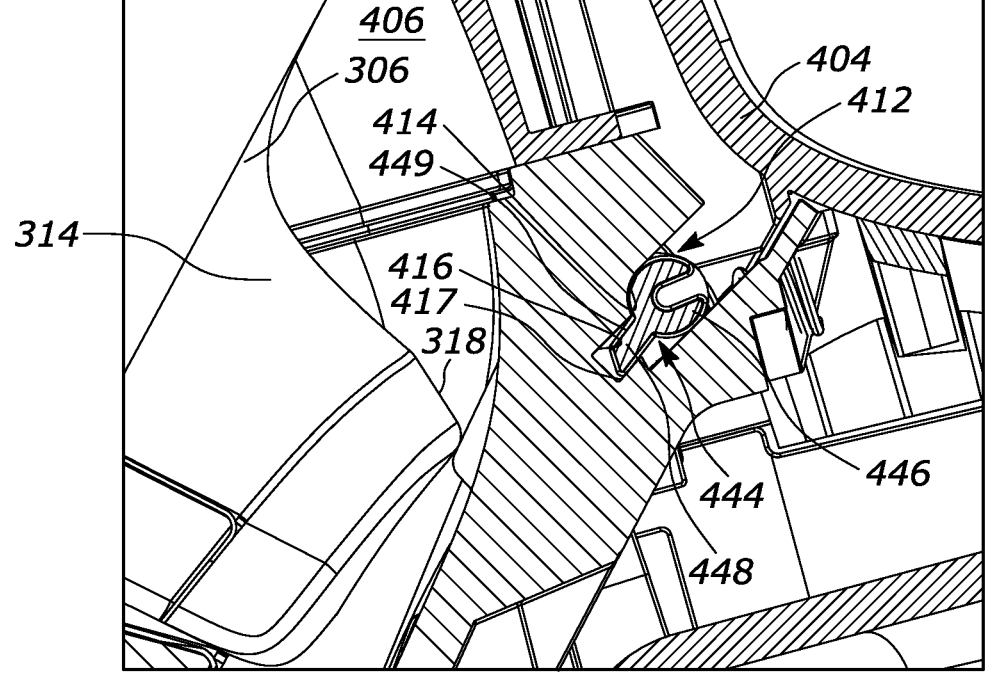
Figure 11:
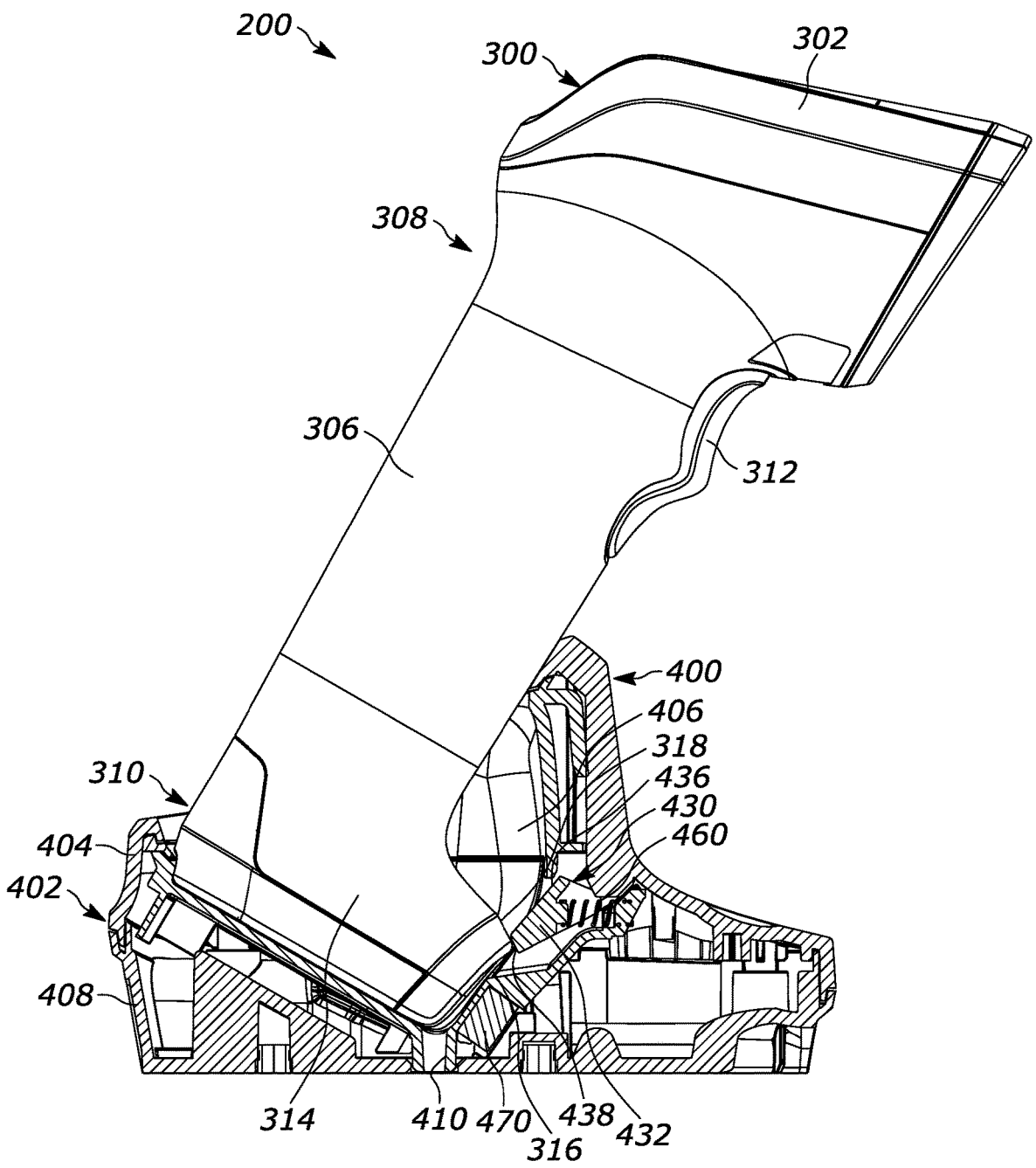
Figure 12:
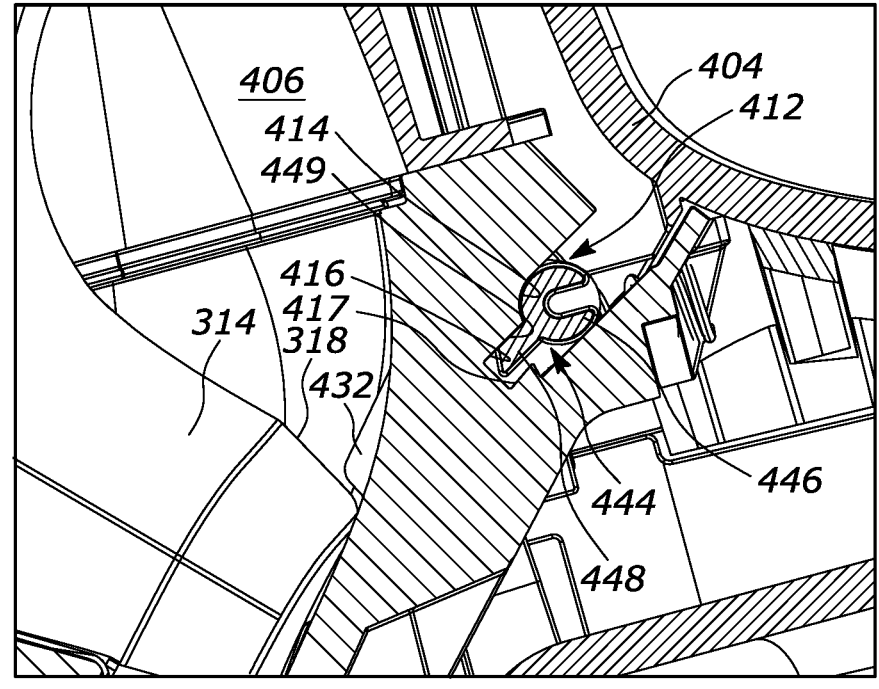
Figure 13:
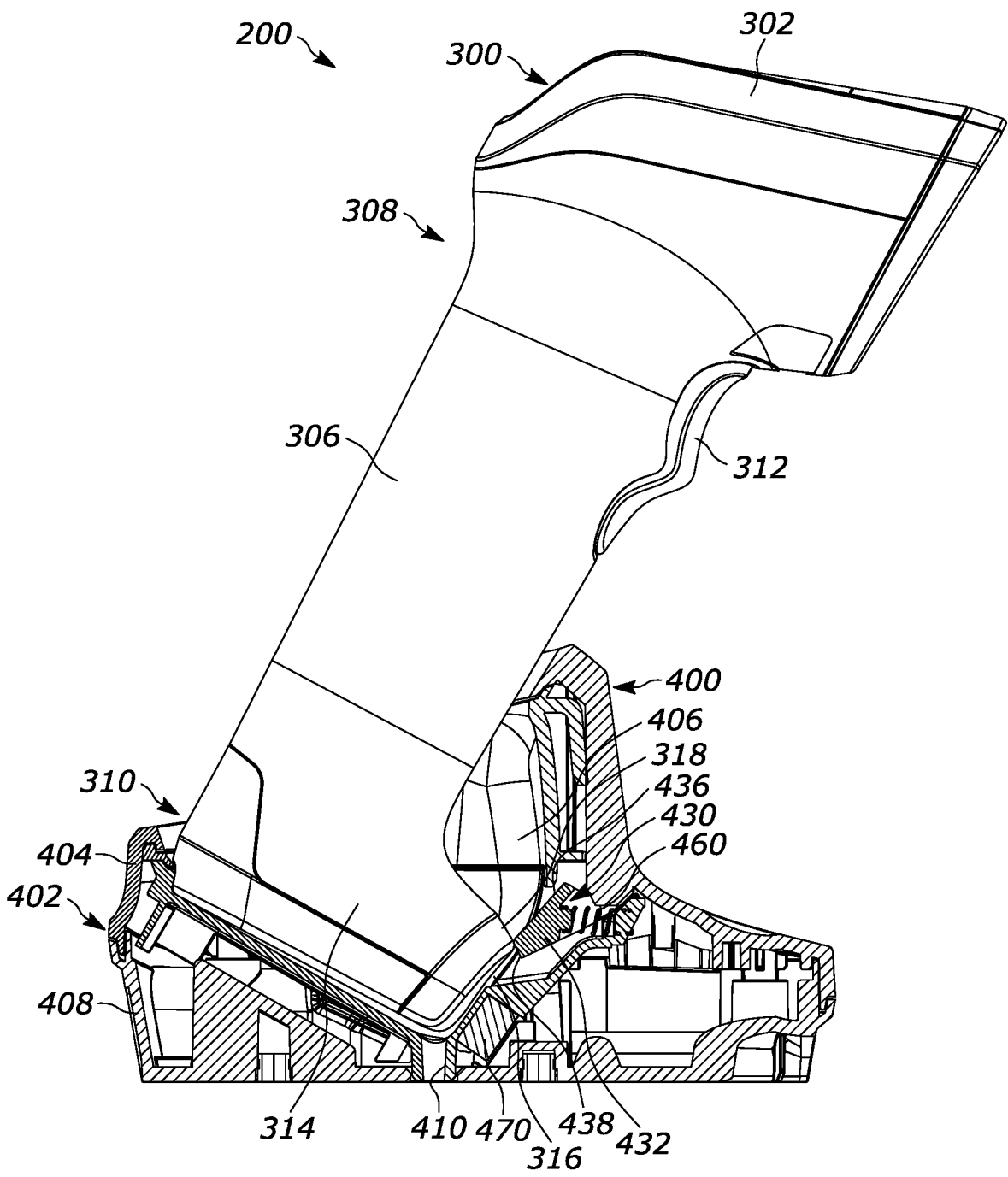
Figure 14:
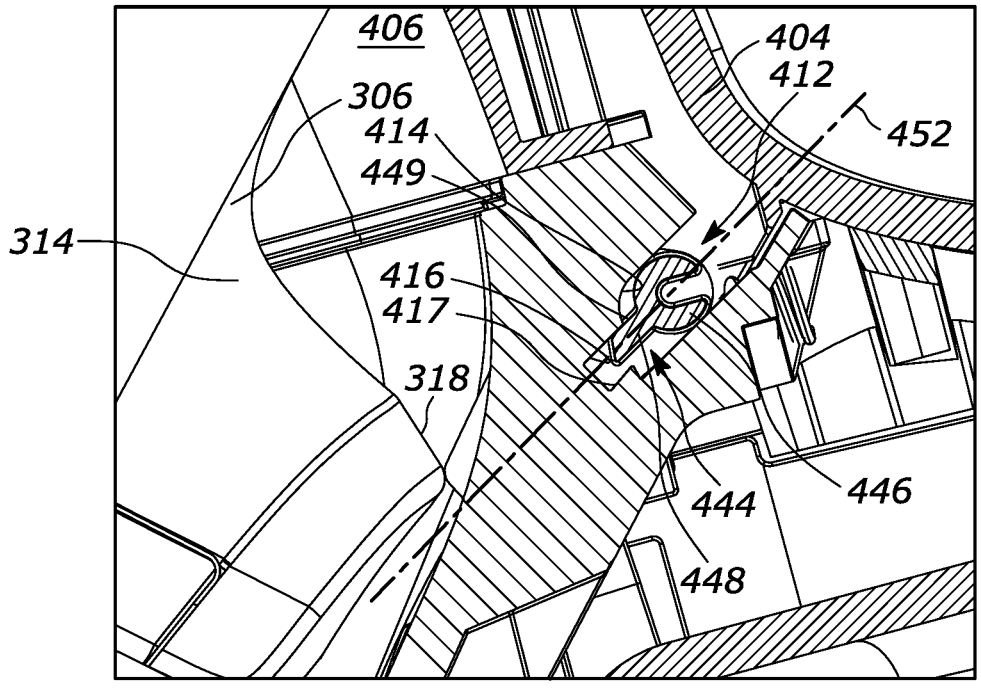

FIG. 1 illustrates a side view of an example mobile workstation;

FIG. 2 illustrates a front perspective view of an example barcode reader assembly of the mobile workstation of FIG. 1;

FIG. 3 illustrates a front perspective view of an example cradle of the barcode reader assembly of FIG. 2;

FIG. 4 illustrates a cross-sectional view of the cradle of FIG. 3, taken along line 4-4 of FIG. 3;

FIG. 5 illustrates a cross-sectional view of the cradle of FIG. 3 taken along line 5-5 of FIG. 3;

FIG. 6 illustrates a cross-sectional view of the cradle of FIG. 3 taken along line 6-6 of FIG. 3;

FIG. 7 illustrates a top view of an example mechanical latch mechanism of the cradle of FIG. 3;

FIG. 8 illustrates a side view of the mechanical latch mechanism of FIG. 7;

FIG. 9 illustrates a cross-sectional view of the cradle of FIG. 3, taken along line 4-4 of FIG. 3, with an example handheld barcode reader being inserted into the cradle;

FIG. 10 illustrates a partial cross-sectional view of the cradle of FIG. 3, taken along line 5-5 of FIG. 3, with the example handheld barcode reader being inserted into the cradle;

FIG. 11 illustrates a cross-sectional view of the cradle of FIG. 3, taken along line 4-4 of FIG. 3, with the example handheld barcode reader fully inserted into the cradle;

FIG. 12 illustrates a partial cross-sectional view of the cradle of FIG. 3, taken along line 5-5 of FIG. 3, with the example handheld barcode reader fully inserted into the cradle;

FIG. 13 illustrates a cross-sectional view of the cradle of FIG. 3, taken along line 4-4 of FIG. 3, with the example handheld barcode reader being removed from the cradle; and FIG. 14 illustrates a partial cross-sectional view of the cradle of FIG. 3, taken along line 5-5 of FIG. 3, with the example handheld barcode reader being removed from the cradle.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example mobile workstations, barcode reader assemblies, and cradles disclosed herein utilize a mechanical latch mechanism in the cradle to provide a high retention/removal force for the handheld barcode reader in the cradle, while also providing an asymmetric lower insertion force to allow the handheld barcode reader to be able to be inserted into the cradle with minimal force. Therefore, when mounted on a mobile workstation, such as those mounted sideways over a monitor in a medical facility, the handheld barcode scanner can be easily inserted into the cradle by the user, but will be retained in the cradle as the mobile workstation is moved.

To provide these asymmetric forces, the mechanical latch mechanism disclosed herein includes a latch bolt that extends into a cavity of the cradle. The latch bolt is limited to rotational movement when the handheld barcode reader is inserted into the cradle, which bends a compression spring coupled to the latch bolt, requiring minimal force. Conversely, the latch bolt is limited to translational movement when the handheld barcode reader is removed from the cradle, which compresses the compression spring, requiring a greater force. The spring constant of the compression spring can be chosen to provide the desired insertion and retention/removal forces required for a particular application.

Referring to FIG. 1, an example mobile workstation 100 is illustrated. Mobile workstation 100 is movable by an operator and generally includes a cart 102, a computing device 120, a display device 122, an input device 124, a mounting bracket 130, and a barcode reader assembly 200.

In the example shown, cart 102 includes a base 104 having a plurality of wheels 106, a tower 108 extending generally vertically from base 104, and a work surface 110 extending from tower 108. Tower 108 can be extendable vertically to allow adjustment of the vertical position of work surface 110. A first handle 112 can be mounted to tower 108 and can extend towards a rear of cart 102 and a second handle 114 can be mounted to work surface 110 or tower 108 and can extend towards a front of cart 102 to allow the operator to move mobile workstation 100 from the front or rear.

Computing device 120 can be positioned on work surface 110, or otherwise mounted on work surface 110 or tower 108, and can be a desktop computer or any type of computing device having at least a processor and memory. Display device 122 is mounted to tower 108, can be a monitor or any other type of display, and is communicatively coupled to computing device 120 via a wired or wireless connection. Input device 124 can be positioned on work surface 110, can be a keyboard, a mouse, a touchpad, or any other type of input device, and is also communicatively coupled to computing device 120 via a wired or wireless connection. In some implementations, display device 122 and input device 124 can be combined into a single device, for example, a touchscreen display. In other implementations, computing device 120, display device 122, and input device 124 could be combined into a single device, for example, a laptop or tablet.

Mounting bracket 130 is secured to display device 122 and/or tower 108 and barcode reader assembly 200 is mounted to mounting bracket 130. Preferably, mounting bracket 130 is secured to display device 122 and/or tower 108 so that at least a portion of mounting bracket 130 extends above display device 122 and at least a head 302 of handheld barcode reader 300 extends past a front of display device 122 with barcode reader assembly 200 mounted to mounting bracket 130. In this configuration, a field-of-view (FOV) 304 of handheld barcode reader 300 would be directed generally downward in front of display device 122.

Referring to FIG. 2, barcode reader assembly 200 generally includes a handheld barcode reader 300 and a cradle 400. Handheld barcode reader 300 can generally be any handheld barcode reader that includes head 302 and a handle 306 that extends from a head 302, such as the Zebra® DS81. In the example shown, handle 306 has a first end 308 that is adjacent head 302 and a second end 310 that is opposite first end 308 and is configured to be inserted into cradle 400. In some implementations, handle 306 can also include a trigger 312 that can be used to activate barcode reader assembly 200.

As shown in FIGS. 3-8, cradle 400 of barcode reader assembly 200 generally includes a housing 402 that forms a cavity 406 that is configured to receive, and to removably retain, handheld barcode reader 300. In the example shown, cavity 406 is formed in an upper housing portion 404 of housing 402, which is secured to a lower housing portion 408, for example, with threaded members. Cradle 400 is configured to be secured to mounting bracket 130, for example, by one or more threaded members 140 that extend through an aperture(s) 132 in mounting bracket 130 and are threaded into a threaded aperture 410 in lower housing portion 408 in housing 402 of cradle 400.

Cradle 400 includes a mechanical latch mechanism 430, which is configured to allow the insertion and removal of, and to removably retain, handheld barcode reader 300 in cradle 400. As described in more detail below, mechanical latch mechanism 430 is configured to require a first force to move handheld barcode reader 300 past mechanical latch mechanism 430 and insert handheld barcode reader 300 fully into cradle 400 and a second force, greater than the first force, to move handheld barcode reader 300 past mechanical latch mechanism 430 and remove handheld barcode reader 300 from cradle 400. The asymmetry of the lower first force (insertion force) and the higher second force (removal force) allows handheld barcode reader 300 to be easily inserted into cradle 400 with minimal force, while providing sufficient force to retain handheld barcode reader 300 in cradle 400 during use and movement of barcode reader assembly 200 on mobile workstation 100. In one implementation, the first force can be about equal to or less than a weight of handheld barcode reader 300 (e.g., the mass of handheld barcode reader 300×9.8 m/s$^2$), which would require an operator to exert minimal force on handheld barcode reader 300 to insert handheld barcode reader 300 into cradle. Cradle 400 can also include a magnet 470 positioned within housing 402 that can be configured to attract a portion of handheld barcode reader 300 (e.g., second end 310 of handle 306) when handheld barcode reader 300 is being inserted into and is fully inserted into cradle 400 to provide assistance to the operator and ease the insertion of handheld barcode reader 300 into cradle 400. In addition, the second force can be greater than or equal to two times the weight of handheld barcode reader 300 (e.g., 2×the mass of handheld barcode reader 300×9.8 m/s$^2$) and less than or equal to four times the weight of handheld barcode reader 300 (e.g., 4×the mass of handheld barcode reader 300×9.8 m/s$^2$) to provide sufficient force to hold handheld barcode reader 300 in cradle 400 during movement of mobile workstation 100, while still allowing the operator to remove handheld barcode reader 300 from cradle 400 without excessive force, when necessary. Other ranges for the second force are also possible, depending on a particular contemplated implementation and usage.

To retain handheld barcode reader 300 in cradle 400 and to provide the desired asymmetrical insertion and removal forces, in the example shown, mechanical latch mechanism 430 includes a latch bolt 432 and a compression spring 460 coupled to latch bolt 432 that, as described in more detail below, is configured to bias latch bolt 432 into a first position. Referring to FIGS. 7-8, latch bolt 432 has a main body 434 that has a first face 436 and a second face 438, which extend into cavity 406 of housing 402. A recess 440 is formed in main body 434 and includes a protrusion 442 that is configured to receive a first end 462 of compression spring 460. A second end 464 of compression spring 460 engages a similar protrusion formed in lower housing portion 408 of housing 402, to secure compression spring 460 between latch bolt 432 and housing 402. Latch bolt 432 also includes a pair of opposing key sections 444 that extend in opposite directions from main body 434 and are configured to be received in a corresponding aperture 412 formed in lower housing portion 408 of housing 402. Each key section 444 has a generally cylindrical protrusion 446 that extends from main body 434 along a first axis 450 and is received in a corresponding arcuate portion 414 of aperture 412 in housing 402, which allows latch bolt 432 to rotate about first axis 450 when handle 306 of handheld barcode reader 300 is inserted into cradle 400 and the first force is exerted by handle 306 on first face 436 of latch bolt 432, as described in more detail below. Each key section 444 also has a generally linear protrusion 448 that can extend from cylindrical protrusion 446 and/or main body 434 along a second axis 452 and is received in a corresponding linear portion 416 of aperture 412 in housing 402, which allows latch bolt 432 to translate along second axis 452 and prevents latch bolt 432 from rotating about first axis 450 when handle 306 of handheld barcode reader 300 is removed from cradle 400 and the second force is exerted by handle 306 on second face 438 of latch bolt 432, as described in more detail below.

When handheld barcode reader 300 is fully removed from cradle 400, compression spring 460 biases latch bolt 432 into a first position (see, e.g., FIGS. 4-5) such that a portion of latch bolt 431 extends into cavity 406 of cradle 400.

As handheld barcode reader 300 is inserted into cradle 400, a side surface 316 of a base 314 at second end 310 of handle 306 of handheld barcode reader 300 engages first face 436 of latch bolt 432 and rotates latch bolt 432 about first axis 450 from the first position to a second position (see, e.g., FIGS. 9-10). When a first force is placed on first face 436 of latch bolt 432 by base 314 and latch bolt 432 is moved from the first position to the second position, latch bolt 432 is configured to rotate about first axis 450 and compression spring 460 is configured to bend. As latch bolt 432 rotates about first axis, cylindrical protrusion 446 of key section 444 of latch bolt 432 engages and rotates within arcuate portion 414 of aperture 412 of cradle 400. To move base 314 of handle 306 of handheld barcode reader 300 past latch bolt 432 and fully insert handheld barcode reader 300 into cradle 400, the first force exerted by base 314 of handle 306 of handheld barcode reader 300 on first face 436 of latch bolt 432 must be greater than the bending force exerted by compression spring 460. Preferably, the bending force exerted by the compression spring, and, therefore, the first force that must be exerted to overcome the bending force and move base 314 of handle 306 of handheld barcode reader 300 past latch bolt 432, is about equal to or less than a weight of handheld barcode reader 300, which would require an operator to exert minimal force on handheld barcode reader 300 to insert handheld barcode reader 300 into cradle.

When handheld barcode reader 300 is fully inserted into cradle 400, base 314 of handle 306 of handheld barcode reader 300 no longer exerts a force on first face 436 of latch bolt 432 and compression spring 460 biases latch bolt 432 back into the first position (see, e.g., FIGS. 11-12).

As handheld barcode reader 300 is removed from cradle 400, a top surface 318 of base 314 of handle 306 engages second face 438 of latch bolt 432 and translates latch bolt 432 along second axis 452 from the first position to a third position (see, e.g., FIGS. 13-14). When a second force is placed on second face 438 of latch bolt 432 by base 314 and latch bolt 432 is moved from the first position to the third position, latch bolt 432 is configured to translate along second axis 452 and compression spring 460 is configured to compress. In the first position, a top surface 449 of linear protrusion 448 on latch bolt 432 engages a bottom surface 417 of linear portion 416 of aperture 412 in housing 402, which prevents latch bolt 432 from rotating about first axis 450 when the second force is exerted by top surface 318 of base 314 on second face 438 of latch bolt 432. Therefore, as the second force is exerted by top surface 318 of base 314 on second face 438 of latch bolt 432, linear protrusion 448 of key section 444 of latch bolt 432 translates along second axis 452 within linear portion 416 of aperture 412 of cradle 400. To move base 314 of handle 306 of handheld barcode reader 300 past latch bolt 432 and fully remove handheld barcode reader 300 from cradle 400, the second force exerted by base 314 of handle 306 of handheld barcode reader 300 on second face 438 of latch bolt 432 must be greater than the compression force exerted by compression spring 460. Preferably, the second force that must be exerted to overcome the compression force exerted by compression spring 460 and move base 314 of handle 306 of handheld barcode reader 300 past latch bolt 432, is greater than or equal to two times the weight of handheld barcode reader 300 and less than or equal to four times the weight of handheld barcode reader 300. This range for the second force provides sufficient force to hold handheld barcode reader 300 in cradle 400 during movement of mobile workstation 100, while still allowing the operator to remove handheld barcode reader 300 from cradle 400 without excessive force, when necessary. Other ranges for the second force are also possible, depending on a particular contemplated implementation and usage. Since the bending force of a compression spring is generally less than the compression force, the rotation of latch bolt 432 during insertion of handheld barcode reader 300 into cradle 400 (causing compression spring 460 to bend) and the translation of latch bolt 432 during removal (causing compression spring 460 to compress) will provide asymmetric insertion and removal forces that will require less force to insert handheld barcode reader 300 into cradle 400 and a greater force to remove handheld barcode reader 300 from cradle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A mobile workstation movable by an operator, the mobile workstation comprising:
   a display device;
   a mounting bracket; and
   a barcode reader assembly mounted to the mounting bracket, the barcode reader assembly comprising:
   a handheld barcode reader; and
   a cradle configured to be secured to the mounting bracket, the cradle comprising a mechanical latch mechanism that is configured to: removably retain the handheld barcode reader in the cradle; require a first force to move the handheld barcode reader past the mechanical latch mechanism and insert the handheld barcode reader fully into the cradle; and require a second force, greater than the first force, to move the handheld barcode reader past the mechanical latch mechanism and remove the handheld barcode reader from the cradle,
   wherein the mechanical latch mechanism comprises a latch bolt that is configured to rotate about a first axis with a first force placed on a first face of the latch bolt and to translate along a second axis, perpendicular to the first axis, with a second force placed on a second face of the latch bolt.

2. The mobile workstation of claim 1, wherein the mounting bracket is secured to the display device and at least a portion of the mounting bracket extends above the display device.

3. The mobile workstation of claim 1, wherein the first force is equal to or less than a weight of the handheld barcode reader.

4. The mobile workstation of claim 1, wherein the second force is greater than or equal to two times a weight of the handheld barcode reader and less than or equal to four times the weight of the handheld barcode reader.

5. The mobile workstation of claim 1, wherein the mechanical latch mechanism comprises a compression spring coupled to the latch bolt and configured to bend with the first force placed on the first face of the latch bolt and the latch bolt rotated about the first axis and to compress with the second force placed on the second face of the latch bolt and with the latch bolt translated along the second axis.

6. The mobile workstation of claim 1, wherein:
   the latch bolt comprises a key section having a generally cylindrical protrusion extending along the first axis and a linear protrusion extending from the cylindrical protrusion along the second axis; and
   a housing of the cradle comprises an aperture having an arcuate portion configured to receive the cylindrical protrusion of the key section of the latch bolt and a linear portion configured to receive the linear protrusion of the latch bolt.

7. The mobile workstation of claim 6, wherein the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

8. The mobile workstation of claim 1, wherein the cradle comprises a magnet configured to attract a portion of the handheld barcode reader with the handheld barcode reader inserted into the cradle.

9. The mobile workstation of claim 1, wherein: the mounting bracket comprises an aperture; the cradle comprises a threaded aperture; and the aperture in the mounting bracket and the threaded aperture in the cradle are configured to receive a threaded member to secure the cradle to the mounting bracket.

10. A barcode reader assembly configured to be mounted on a mobile workstation movable by an operator, the barcode reader assembly comprising:
   a handheld barcode reader; and
   a cradle comprising a mechanical latch mechanism that is configured to: removably retain the handheld barcode reader in the cradle; require a first force to move the handheld barcode reader past the mechanical latch mechanism and insert the handheld barcode reader fully into the cradle; and require a second force, greater than the first force, to move the handheld barcode reader past the mechanical latch mechanism and remove the handheld barcode reader from the cradle,
   wherein the mechanical latch mechanism comprises a latch bolt that is configured to rotate about a first axis with a first force placed on a first face of the latch bolt and to translate along a second axis, perpendicular to the first axis, with a second force placed on a second face of the latch bolt.

11. The barcode reader assembly of claim 10, wherein the first force is equal to or less than a weight of the handheld barcode reader.

12. The barcode reader assembly of claim 10, wherein the second force is greater than or equal to two times a weight of the handheld barcode reader and less than or equal to four times the weight of the handheld barcode reader.

13. The barcode reader assembly of claim 10, wherein the mechanical latch mechanism comprises a compression spring coupled to the latch bolt and configured to bend with the first force placed on the first face of the latch bolt and the latch bolt rotated about the first axis and to compress with the second force placed on the second face of the latch bolt and the latch bolt translated along the second axis.

14. The barcode reader assembly of claim 10, wherein:
the latch bolt comprises a key section having a generally cylindrical protrusion extending along the first axis and a linear protrusion extending from the cylindrical protrusion along the second axis; and
a housing of the cradle comprises an aperture having an arcuate portion configured to receive the cylindrical protrusion of the key section of the latch bolt and a linear portion configured to receive the linear protrusion of the latch bolt.

15. The barcode reader assembly of claim 14, wherein the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

16. The barcode reader assembly of claim 10, wherein the cradle comprises a magnet configured to attract a portion of the handheld barcode reader with the handheld barcode reader inserted into the cradle.

17. A cradle for a barcode reader assembly configured to be mounted on a mobile workstation movable by an operator, the cradle comprising:
a housing forming a cavity configured to receive a handheld barcode reader;
a mechanical latch mechanism disposed within the housing, the mechanical latch mechanism configured to:
removably retain the handheld barcode reader in the cradle; require a first force to move the handheld barcode reader past the mechanical latch mechanism and insert the handheld barcode reader fully into the cradle; and require a second force, greater than the first force, to move the handheld barcode reader past the mechanical latch mechanism and remove the handheld barcode reader from the cradle,
wherein the mechanical latch mechanism comprises a latch bolt that is configured to rotate about a first axis with a first force placed on a first face of the latch bolt and to translate along a second axis, perpendicular to the first axis, with a second force placed on a second face of the latch bolt.

18. The cradle of claim 17, wherein the first force is equal to or less than a weight of the handheld barcode reader.

19. The cradle of claim 17, wherein the second force is greater than or equal to two times a weight of the handheld barcode reader and less than or equal to four times the weight of the handheld barcode reader.

20. The cradle of claim 17, wherein the mechanical latch mechanism comprises a compression spring coupled to the latch bolt and configured to bend with the first force placed on the first face of the latch bolt and the latch bolt rotated about the first axis and to compress with the second force placed on the second face of the latch bolt and the latch bolt translated along the second axis.

21. The cradle of claim 17, wherein:
the latch bolt comprises a key section having a generally cylindrical protrusion extending along the first axis and a linear protrusion extending from the cylindrical protrusion along the second axis; and
a housing of the cradle comprises an aperture having an arcuate portion configured to receive the cylindrical protrusion of the key section of the latch bolt and a linear portion configured to receive the linear protrusion of the latch bolt.

22. The cradle of claim 21, wherein the aperture in the housing of the cradle allows rotation of the latch bolt about the first axis with the first force placed on the first face of the latch bolt, prevents rotation of the latch bolt about the first axis with the second force placed on the second face of the latch bolt, and allows translation of the latch bolt along the second axis with the second force placed on the second face of the latch bolt.

23. The cradle of claim 17, wherein the cradle comprises a magnet configured to attract a portion of the handheld barcode reader with the handheld barcode reader inserted into the cradle.

24. The cradle of claim 17, wherein the housing comprises a threaded aperture configured to receive a threaded member to secure the cradle to a mounting bracket.

* * * * *